United States Patent [19]

Gistinger et al.

[11] 4,366,191
[45] Dec. 28, 1982

[54] METHOD OF INCREASING THE STRENGTH OF CARBON AND GRAPHITE MEMBERS

[75] Inventors: Guido Gistinger, Biberbach; Manfred Schmid, Meitingen, both of Fed. Rep. of Germany

[73] Assignee: Sigri Elektrographit GmbH, Meitingen bei Augsberg, Fed. Rep. of Germany

[21] Appl. No.: 870,852

[22] Filed: Jan. 19, 1978

[30] Foreign Application Priority Data

Feb. 12, 1977 [DE] Fed. Rep. of Germany ....... 2706033

[51] Int. Cl.³ .............................................. B05D 3/08
[52] U.S. Cl. .................................. 427/228; 264/29.5; 264/29.6; 423/445; 423/448; 427/379; 427/434.3
[58] Field of Search ............... 427/228, 430 B, 379, 427/DIG. 11, 434.3; 264/29.5, 29.6; 423/448, 445

[56] References Cited

U.S. PATENT DOCUMENTS

| | | | |
|---|---|---|---|
| 3,462,289 | 8/1969 | Rohl et al. | 427/294 X |
| 3,810,780 | 5/1974 | Ardary et al. | 427/228 |
| 3,917,884 | 11/1975 | Jahn | 264/29.5 X |
| 4,100,322 | 7/1978 | Seibold et al. | 427/228 |

FOREIGN PATENT DOCUMENTS

| | | | |
|---|---|---|---|
| 2276913 | 1/1976 | France | 427/430 |
| 992085 | 6/1965 | United Kingdom | 423/445 |

*Primary Examiner*—Ronald H. Smith
*Assistant Examiner*—Janyce A. Bell
*Attorney, Agent, or Firm*—Herbert L. Lerner

[57] ABSTRACT

Increasing the strength and improving other properties of porous carbon or graphite bodies by immersing the porous body in a mixture containing 35–70% hardenable resin and 30 to 65% volatile solvent to impregnate pores. The impregnated porous body is heated to 120° to 180° C. to harden the resin. Carbonization of the body is effected by heating in an inert atmosphere at a rate of at least 3 K/hr to 800°–1300° C. Improved strength bodies are obtained with a single impregnation and single carbonizing step.

8 Claims, 4 Drawing Figures

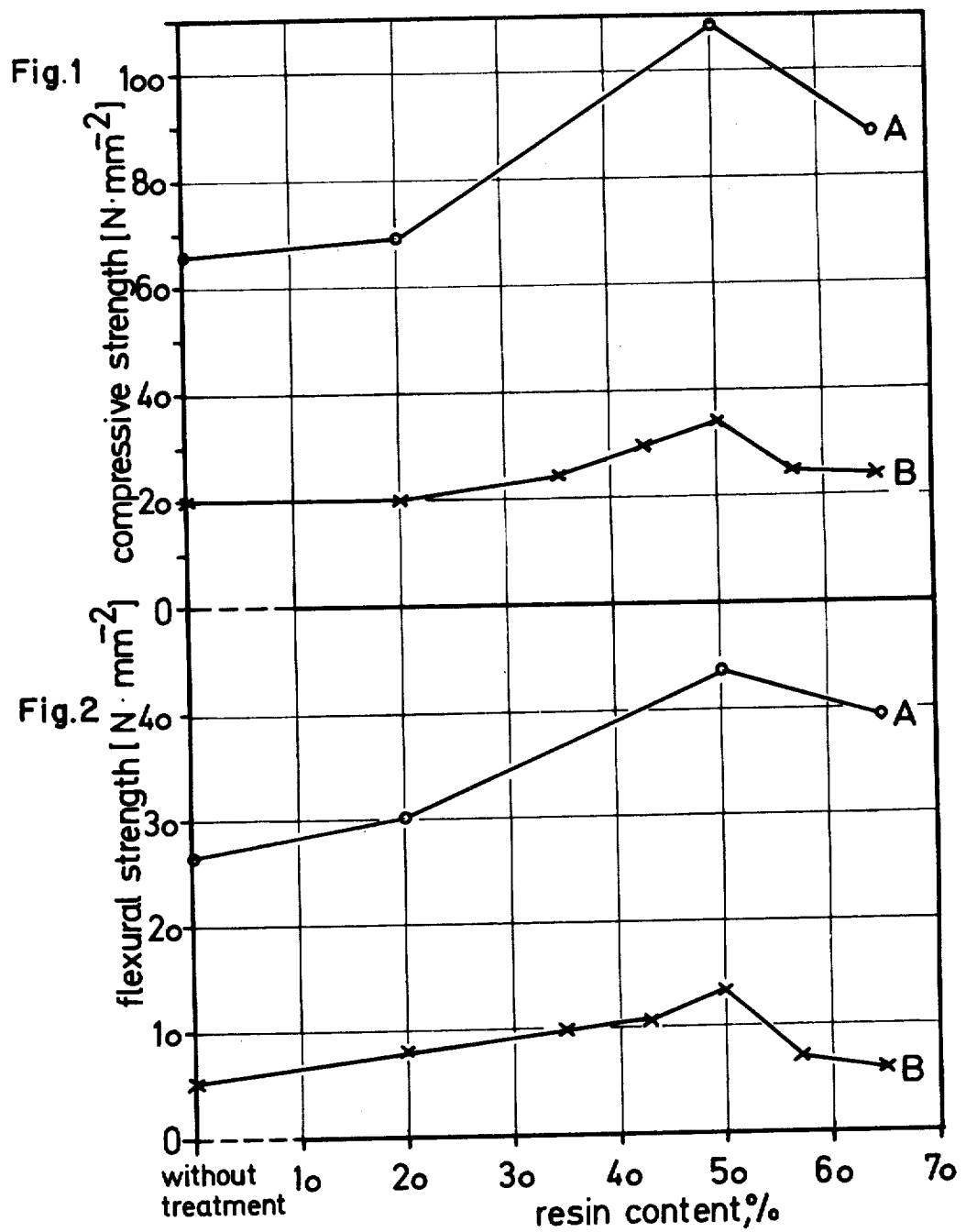

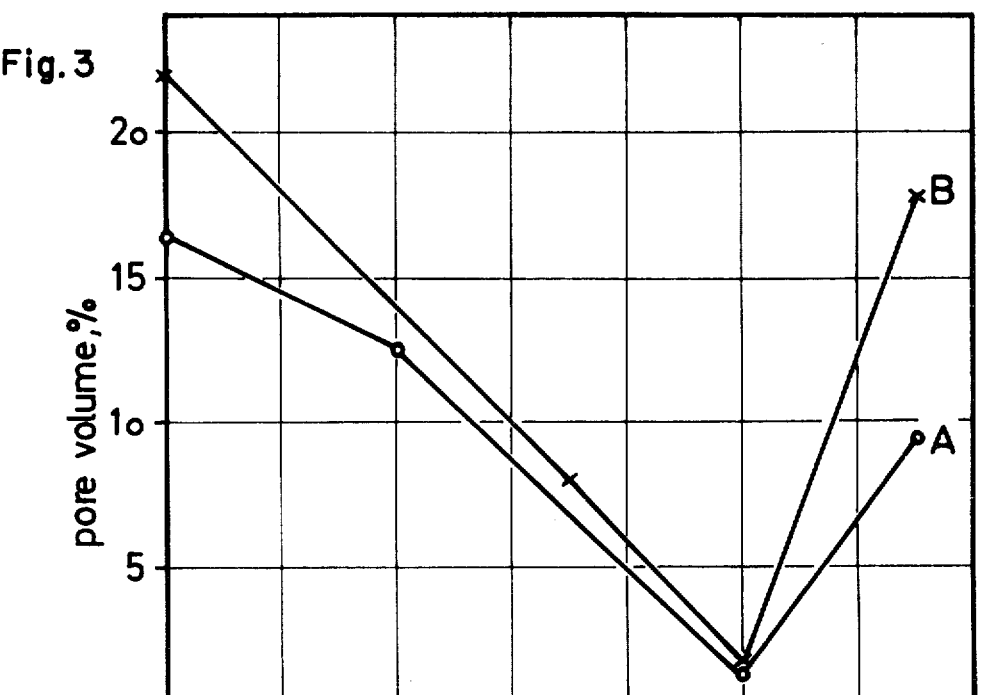
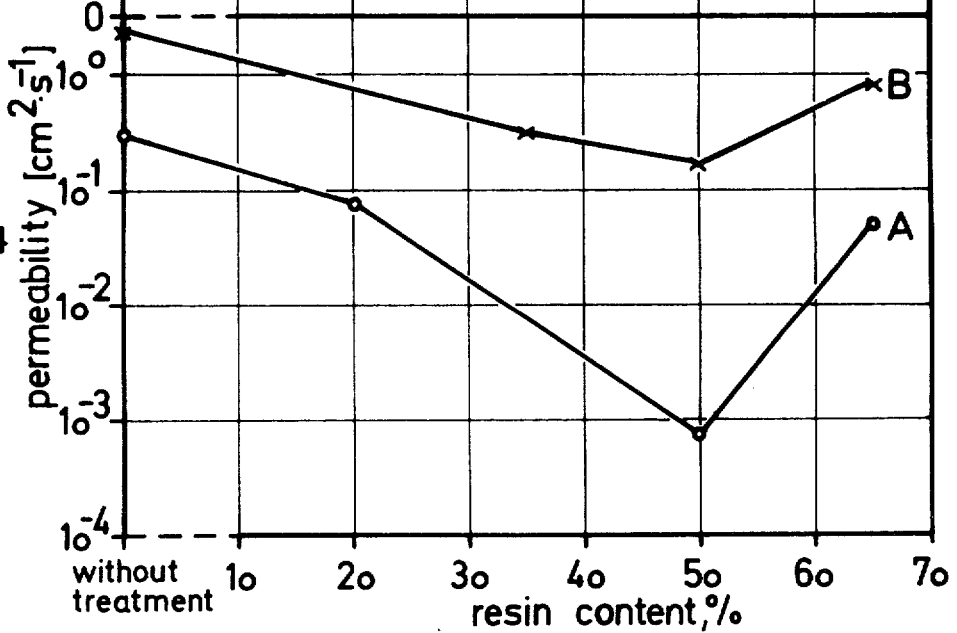

METHOD OF INCREASING THE STRENGTH OF CARBON AND GRAPHITE MEMBERS

BACKGROUND OF THE INVENTION

1. Field of the Invention

This invention relates to a method of increasing the strength of a porous body of carbon or graphite in which the pores of the body are filled at least partly with one or several carbonizable impregnating media and the impregnating media are carbonized in the pores of the body by a heat treatment.

2. Description of the Prior Art

In the manufacture of carbon and graphite members it is known to mix coke, graphite, carbon black and other carbon-containing substances of suitable grain fineness with a carbonizable binder such as tar pitches or resins, and to form bodies, by pressing, compacting or casting from such mixtures. The thus formed parts are heated in the absence of air to about 1000° C. for carbonizing the binder and, if indicated, to about 2800° C. for converting the carbon into graphite. Pores are produced in the bodies, especially in the carbonizing phase, by pyrolysis of the binders and the transport of gaseous dissociation products formed in the process within the bodies. The number and size of the pores are determined in large measure by the kind and the distribution of the starting materials, the respective shaping method and the condition of carbonizing.

There has been no lack of attempts and numerous methods have become known to reduce the porosity of carbon and graphite bpdoes by impregnation with a carbonizable substance, particularly to eliminate the adverse effect of the pores on the strength of the bodies and to decrease at the same time the permeability of the bodies for gases and liquids. Impregnating media are, for instance, bituminous coal tar pitches, petroleum pitches or hardenable resins such as phenol-formaldehyde resins or furan resins which are introduced alone or as a mixture, if necessary at elevated pressure, into the bores of the carbon or graphite bodies. The pitch-impregnated bodies are heated directly to a temperature of about 1000° C. to convert the impregnating medium into carbon. For bodies impregnated with resin it is necessary to precede this with a heat treatment which is specific to the respective type of resin. The impregnating medium stored in the pores is pyrolyzed during the heat treatment, forming coke and gaseous decomposition products where again open pores, i.e., pores accessible from the surface, are produced in the bodies. For improving the strength of the bodies substantially and to reduce the permeability, it is therefore necessary to repeat the cycle consisting of impregnation, hardening if required, and carbonization of the impregnating medium several times. It is advantageous to use for each subsequent impregnating step an impregnating medium with lower viscosity as with a progressing number of cycles, the diameter of the pores and thereby, the transport velocity of the impregnating medium in the pores becomes smaller because of the embedment of the carbon. However, since impregnating media with a lower viscosity have in general also less coke residue, the effectiveness of the method decreases steadily with the number of repetitions, so that the desired improvement may require a large number of cycles.

According to another method, it is known to densify carbon and graphite bodies by precipitation of carbon from the gaseous phase inside the pores of the bodies and to improve the strength of the latter. The bodies heated to a temperature between about 800° and 1600° C. are exposed to hydrocarbon-containing gases such as propane, benzene vapor, etc. and a suitable carrier gas, which diffuse at least in part into the pores and are decomposed at the hot walls of the pores, precipitating carbon. The precipitation of the carbon within the pores requires accurate matching of the process conditions such as temperature, concentration and pressure difference, to the respective characteristic of the body, such as dimensions, porosity and distribution of pore size, and continuous changing of the conditions with reference to the instantaneous degree of change of size of the pores. Large-size bodies and bodies with complicated shapes, particularly, cannot be impregnated satisfactorily with carbon by this method. The properties of the bodies are not sufficiently improved, as the carbon is preferentially precipitated at the outer surface or at certain zones or portions of the body.

SUMMARY OF THE INVENTION

An object of the invention is to provide a process for improving the strength of carbon and graphite bodies by a technically simple method which does not have the disadvantages of the known impregnating methods and is substantially independent of the format and shape of the bodies to be treated.

With the foregoing and other objects in view, there is provided in accordance with the invention a method of increasing the strength of a porous carbon or graphite body which includes (a) immersing the porous body in a mixture in which 35 to 70% by weight of a hardenable resin selected from the group consisting of phenol-formaldehyde resins, novolaks, furan resins and melamine resins is admixed with 30 to 65% by weight of a volatile liquid, organic solvent, to impregnate the pores of the porous body with the mixture;

(b) heating the impregnated porous body to a temperature of 120° to 180° C. to effect hardening the resin in the pores; and (c) carbonizing the impregnating medium by heating in an inert or reducing atmosphere at a rate of at least 3 K/hr to a temperature of 800° to 1300° C.

Other features which are considered as characteristic for the invention are set forth in the appended claims.

Although the invention is illustrated and described herein as embodied in method of increasing the strength of carbon and graphite members, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which FIG. 1 shows the compression strength of graphite bodies treated in accordance with the invention; and FIG. 2 shows the flexural strength of graphite bodies treated in accordance with the invention; and FIG. 3 shows the accessible pore volume of graphite bodies treated in accordance with the invention, and FIG. 4 shows the permeability of graphite bodies treated in accordance with the invention.

DETAILED DESCRIPTION OF THE INVENTION

The impregnating medium used contains a mixture of 35 to 70% by weight of a hardenable resin and 30 to 65% by weight of volatile solvent. The impregnated body is heated to a temperature of between 800° and 1300° C. at a rate of more than 3 K/hr to effect carbonizing the impregnating medium.

An impregnating medium is preferably used which contains 45 to 55% by weight of a hardenable resin and 45 to 55% by weight of a volatile solvent. Especially advantageous is the use of a novolak resin.

In the known methods, a substantial increase of the strength of carbon and graphite bodies can be achieved only by repeating the impregnating and carbonizing steps several times. Impregnating media with a coke residue as high as possible, i.e., substances not diluted by solvents are used. The speed of the carbonization is relatively low, as the bodies can be damaged by the formation of cracks. In the method according to the invention, a single impregnation and carbonizing step and fast heating of the impregnated body are sufficient for achieving the desired effect. The cause of this surprising effect is not completely clear. The low-viscosity impregnating medium possibly penetrates into very fine cracks of the body and blocks the propagation of cracks, while a separation of the impregnating medium films from the walls of the pores during the pyrolysis is prevented by the rapid heating up to complete carbonization. Due to the technical simplicity and also from a cost point of view, the method according to the invention is superior to the known methods for improving the strength of carbon and graphite bodies.

Suitable mixtures for carrying out the method according to the invention contain, for instance, a phenol-formaldehyde resin and methanol. Particularly advantageous representatives of this group of resins are novolaks, which are distinguished by simple handling and stability. Other suitable mixtures consist, for instance, of furan resin/methanol or malamine resin/methanol. Other volatile solvents such as alcohols, ethers, ketones or hydrocarbons can also be used successfully. Examples of volatile solvents are low boiling organic compounds such as methyl, ethyl, propyl and butyl alcohols, dibutyl ether, ethyl tert-amyl ether, acetone, ethyl methyl ketone, and normally liquid $C_5$–$C_8$ hydrocarbons, preferably fractions containing mixtures of the hydrocarbons. Volatile solvents as well as the resins are conventional are long known in the art—"The Chemistry of Synthetic Resins" by Carleton Ellis, 1935, Reinhold Publishing Corporation. It is important for attaining the invention to have rapid heating of the impregnated bodies to a temperature of about 800° to 1300° C., for carbonizing the impregnating medium. The heating takes place in an inert or reducing atmosphere as is conventional. The rate of heating is at least 3 K/hr and preferably, at least 4 K/hr. The upper limit of the rate of heating is given by the formation of cracks in the carbon or graphite bodies, the cracks depending on the specific size and shape of the respective bodies. If the shape is unusual, one or two samples may be tested to determine the upper limit of crack formation, but in general the range will be from above 3 K/hr to less than 10 K/hr.

For carrying out the method, it is advantageous to place carbon and graphite bodies in an impregnating tank and to reduce the tank pressure to about $10^{-2}$ bar or less. After the impregnating medium enters the pores, the pressure is increased to about 10 bar. If the resin contains a hardening catalyst, a special temperature treatment for hardening the impregnating medium is not necessary. If no hardening catalyst was added, the resin is set by heating the bodies to about 120° to 180° C., and the hardening may optionally also be accomplished at elevated pressure. Hardening catalysts are well known in the art, a common one being hexamethylene tetramine. The bodies are then heated in an inert or reducing atmosphere or in a vacuum to about 1300° C. To carbonize the impregnating medium, the heating time is less than 333 hours at a rate greater than 3 K/hr. If required, the bodies can be heated further to about 2800° C., to convert the impregnating coke into graphite.

The invention will be explained in greater detail in the following by means of examples and drawings.

The drawings relate to two types of graphite which differ as to porosity and pore spectrum; the molded type A has relatively fine pores, while the extrusion-pressed type B has relatively large ones.

|  | A | B |  |
| --- | --- | --- | --- |
| Porosity | 16 | 22 | % |
| Mean pore diameter | 3 | 30 | um |
| Maximum pore diameter | 7 | 800 | um |
| Dimensions | 550 × 455 × 260 | 180 × 180 × 115 | mm |

After a drying treatment at a temperature of about 120° C., the graphite bodies were placed in an impregnating tank and impregnated with a solution which contained a novolak resin with 8% hexamethylene tetramine and 35 to 80% by weight methanol; the viscosity of the solutions was 800 to 4 mPa s, depending on the resin content in each case. The pressure in the impregnating tank was first lowered to about $10^{-2}$ bar and was increased to 11 bar after the resin solution was fed in. After a dwelling time of 12 hours the graphite blocks were removed from the tank and heated within 2 hours to a temperature of 150° C. to harden the resin. This temperature was maintained for 12 hours, and subsequently, the heat was increased for carbonizing the impregnating medium at a rate of about 5° C./hr to 1000° C. under air exclusion.

The property data of the graphite bodies prepared by the method according to the invention are presented graphically in the drawings as a function of the composition of the impregnating medium. The measurement points "0% resin" always indicate the non-impregnated starting body. The relationship between the flexual strength and the composition of the impregnating solution can be seen from FIG. 2. The flexual strength increases at first with the resin content of the solution, then goes through a maximum at a composition of about 50% resin and 50% solvent, and drops relatively steeply to the starting value with increasing resin content. The percent increase of the flexual strength for the most advantageous composition of the impregnating medium mixture for type A is about 64% and for type B, about 127%.

In FIG. 1, the compression strength of the impregnated bodies is plotted versus the composition of the impregnating medium. The maximum relative increase is about 65% for type A and about 70% for type B, likewise for a composition of the impregnating medium of about 50% resin and 50% solvent.

By the impregnating method according to the invention it is not only possible to increase the strength of carbon and graphite bodies considerably, but the method also decreases the accessible pore volume and thereby, the permeability or transmittivity of these bodies for gases and liquids. The accessible pore volume, which was determined with water at a pressure of 2 bar, is reduced, for instance, to about 1/10 of the original value.

The curves shown in FIG. 3 indicate that the maximum improvement is obtained with a composition of the impregnating medium mixture of about 50% resin and 50% solvent and the advantageous effect is reduced more with increasing resin content than with increasing solvent content. As an example for the reduction of the permeability of the impregnated bodies, the permeability coefficient is plotted in FIG. 4 versus the composition of the impregnating medium.

Carbon and graphite bodies produced by the method according to the invention exhibit, in addition to high strength, excellent stability against attack by surrounding substances. The permeability for liquids and gases is small up to high temperatures and the high temperature-cycling stability of graphite bodies is not affected adversely by the impregnation. The bodies are accordingly suitable for applications such as structural elements for high-temperature nuclear reactors or sliding-ring seals for corrosive substances, which require, besides high strength, good chemical stability and low permeability.

There is claimed:

1. Method of increasing the strength of a porous carbon or graphite body formed from a mixture of granular carbon-containing substances with a carbonizable binder and heating in the absence of air to carbonize the binder which comprises subjecting said body to a single resin impregnation and carbonization by
   (a) immersing the porous body in a mixture in which 35 to 70% by weight of a hardenable resin containing an aldehyde, selected from the group consisting of phenol-formaldehyde resins, furan resins and melamine resins is admixed with 30 to 65% by weight of a volatile liquid, organic solvent and in the absence of colloidal graphite, to impregnate the pores of the porous body with said mixture;
   (b) Heating the impregnated porous body to a temperature of 120° to 180° C. to effect hardening the resin in said pores; and
   (c) carbonizing the impregnating medium by heating in an inert or reducing atmosphere at a rate of at least 3 K/hr to a temperature of 800° to 1300° C.

2. Method according to claim 1, wherein the volatile solvent is selected from the group consisting of alcohols, ethers and ketones.

3. Method according to claim 1, wherein there is 45 to 55% by weight hardenable resin and 45 to 55% by weight solvent.

4. Method according to claim 1, wherein the phenol-formaldehyde resin is a novolak.

5. Method according to claim 3, wherein the phenol-formaldehyde resin is a novolak.

6. Method according to claim 1, wherein carbonizing is effected by heating at a rate of at least 4 K/hr.

7. Method according to claim 3 wherein carbonizing is effected by heating at a rate of at least 4 K/hr.

8. Method according to claim 4, wherein carbonizing is effected by heating at a rate of at least 4 K/hr.